(12) United States Patent
Fung et al.

(10) Patent No.: US 9,735,870 B2
(45) Date of Patent: Aug. 15, 2017

(54) TAPS FOR BIDIRECTIONAL HIGH-SPEED DATA ON OPTICAL FIBERS

(71) Applicant: Ixia, Calabasas, CA (US)

(72) Inventors: Randy Fung, San Jose, CA (US); Marcel Felix Desdier, Pleasanton, CA (US)

(73) Assignee: IXIA, Calabasas, CA (US)

( * ) Notice: Subject to any disclaimer, the term of this patent is extended or adjusted under 35 U.S.C. 154(b) by 0 days.

(21) Appl. No.: 14/918,538

(22) Filed: Oct. 20, 2015

(65) Prior Publication Data

US 2017/0111114 A1    Apr. 20, 2017

(51) Int. Cl.
| | |
|---|---|
| *H04J 14/02* | (2006.01) |
| *G02B 6/02* | (2006.01) |
| *G02B 6/28* | (2006.01) |
| *H04B 10/25* | (2013.01) |
| *H04B 10/079* | (2013.01) |

(52) U.S. Cl.
CPC ..... *H04B 10/2503* (2013.01); *H04B 10/0793* (2013.01); *H04B 10/07957* (2013.01)

(58) Field of Classification Search
None
See application file for complete search history.

(56) References Cited

U.S. PATENT DOCUMENTS

| | | | | |
|---|---|---|---|---|
| 6,240,222 | B1 * | 5/2001 | Bergmann | G02B 6/266 385/16 |
| 9,182,550 | B1 * | 11/2015 | Liu | G02B 6/29385 |
| 2004/0004756 | A1 * | 1/2004 | Hainberger | H04B 10/2972 359/341.3 |
| 2007/0104426 | A1 * | 5/2007 | Yun | G02B 6/4214 385/88 |
| 2007/0121649 | A1 * | 5/2007 | Cicchetti | H04B 10/1149 370/401 |
| 2011/0211473 | A1 * | 9/2011 | Matityahu | H04L 47/10 370/252 |
| 2015/0288449 | A1 * | 10/2015 | Coffey | G02B 6/3897 398/141 |

(Continued)

OTHER PUBLICATIONS

"Network Taps," Net Optics, Inc. Oct. 1, 2014. http://web.archive.org/web/20141001074101/http://www.netoptics.com/products/networktaps.

(Continued)

*Primary Examiner* — Oommen Jacob
(74) *Attorney, Agent, or Firm* — Jenkins, Wilson, Taylor, & Hunt, P.A.

(57) ABSTRACT

A system for monitoring data traversing a bidirectional optical fiber includes a network tap. The network tap includes first and second network ports for bidirectional data transmission over a first optical fiber. The device includes first and second tap ports respectively associated with the first and second network ports. The first network port receives data transmitted in a first direction over the first optical fiber and at a first wavelength and provides the data to the second network port and to the first tap port. The second network port receives data transmitted in a second direction opposite the first direction over the first optical fiber and at a second wavelength different from the first wavelength and provides the data to the first network port and to the second tap port. The first and second tap the first and second tap ports provide the data to one or more network monitoring devices.

12 Claims, 8 Drawing Sheets

(56) References Cited

U.S. PATENT DOCUMENTS

2016/0105237 A1* 4/2016 Wang ................. H04B 10/2581
                                                398/67
2016/0127074 A1* 5/2016 He .......................... H04J 14/06
                                                398/26
2016/0173225 A1* 6/2016 Cavaliere ............ H04J 14/0287
                                                398/7

OTHER PUBLICATIONS

"Filter Based Multi-Mode Splitter," FMMS, GLSUN, Spec. No. S1197, www.glsun.com, p. 1 (Publication date unknown, but believed to be prior to Oct. 20, 2015).

* cited by examiner

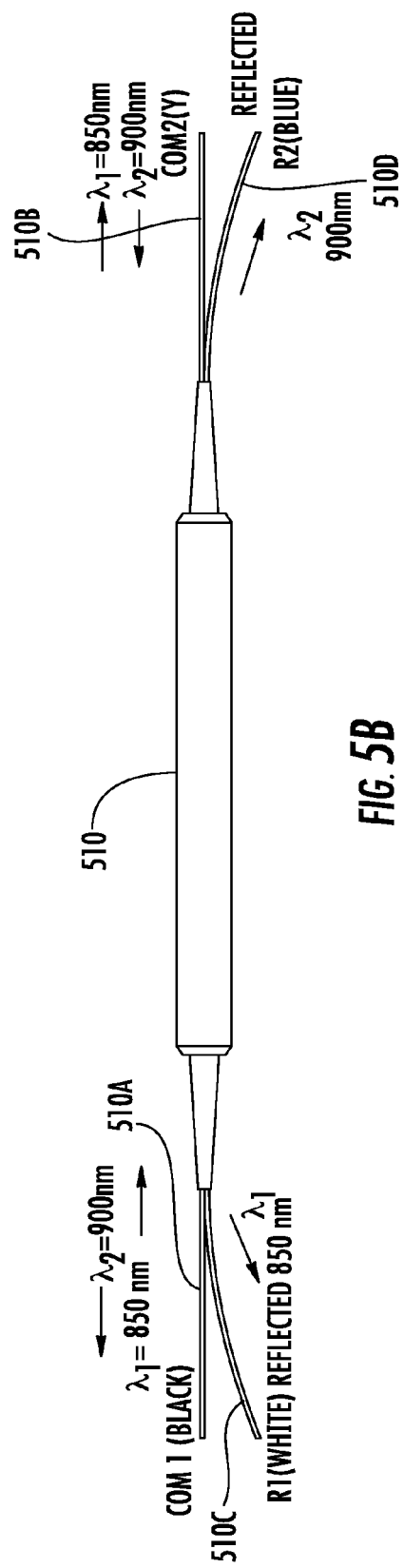

TAPS FOR BIDIRECTIONAL HIGH-SPEED DATA ON OPTICAL FIBERS

BACKGROUND OF THE INVENTION

Digital data in the form of binary information has long been carried on optical fibers. Nowadays, the network of optical fibers spans the globe, forming the backbone of the Internet, the intranet, and extending all the way to the curb or even inside residences and businesses.

In the past, each optical fiber carries information unidirectionally (in only one direction such as in the transmit direction or in the receive direction), and a pair of optical fibers would be employed to implement a bidirectional flow of information between two communicating devices.

Bidirectional fibers carry data in both directions. Since each fiber carries both the transmit data and the receive data, the bandwidth capacity of each fiber is essentially doubled. Generally speaking, different wavelengths are employed for the two directions of information flow on each fiber. Multimode optical fiber technology has been employed to good effect to enable bidirectional traffic on optical fibers, for example.

Data monitoring using network taps has also been widely implemented. In network tapping, a portion of the information flow or the entire information flow on the fiber may be tapped, or duplicated, to be sent to a monitoring device. When data flow is only unidirectional on each fiber, tapping has been relatively straightforward. In an example, a splitter may be employed to receive data from the optical fiber (which data is sent from some transmitting equipment) and to provide two outputs. The first output provides the same data stream onward to the receiving equipment. The second output provides some or all of the same data stream to the monitoring equipment.

In this manner, the data is still transmitted from the transmitting equipment to the receiving equipment if desired. However, some or all of the data is duplicated and provided to the monitoring equipment. The tapped or duplicated data permits the monitoring equipment to perform tasks such as malware detection, network monitoring, access control, and the like. Optical network taps are available from vendors such as Ixia Corporation of Calabasas, Calif. and will not be further elaborated here.

Bidirectional traffic on each fiber, while increasing the bandwidth capacity of the fiber, complicates tapping. Tapping is particularly challenging when data is transmitted and received at high speeds, such as at 10 gigabits/second or above.

Embodiments of the subject matter described herein relate to methods and apparatus for efficiently tapping data on optical fibers that carry high speed bidirectional data traffic.

BRIEF DESCRIPTION OF THE SEVERAL VIEWS OF THE DRAWINGS

The subject matter described herein is illustrated by way of example, and not by way of limitation, in the figures of the accompanying drawings and in which like reference numerals refer to similar elements and in which:

FIG. 5B shows a single-stage four port filter for monitoring bidirectional data on a bidirectional optical fiber according to an alternate embodiment of the subject matter described herein.

SUMMARY

Figure 1:
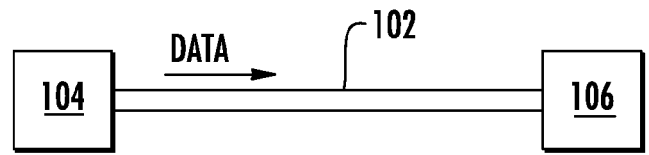
FIG. 1 shows an example of a prior art arrangement wherein a unidirectional fiber is employed to transmit data unidirectionally between two transceivers.

A system for monitoring data traversing a bidirectional optical fiber includes a network tap 720. The network tap 720 includes first and second network ports 510A and 510B or 604A and 606A for bidirectional data transmission over a first optical fiber 706. The device includes first and second tap ports 510C and 510D or 604B and 606B respectively associated with the first and second network ports 510A and 510B or 604A and 606A. The first network port 510A or 604A receives data transmitted in a first direction over the first optical fiber 706 and at a first wavelength and provides the data to the second network port 510B or 606A and to the first tap port 510C or 604B. The second network port 510B or 606A receives data transmitted in a second direction opposite the first direction over the first optical fiber 706 and at a second wavelength different from the first wavelength and provides the data to the first network port 510A or 604A and to the second tap port 510D or 606B. The first and second tap ports 510C and 510D or 604A and 606B provide the data to one or more network monitoring devices.

DETAILED DESCRIPTION OF EMBODIMENTS

The subject matter described herein will now be described in detail with reference to a few embodiments thereof as illustrated in the accompanying drawings. In the following description, numerous specific details are set forth in order to provide a thorough understanding of the present invention. It will be apparent, however, to one skilled in the art, that the subject matter described herein may be practiced without some or all of these specific details. In other instances, well known process steps and/or structures have not been described in detail in order to not unnecessarily obscure the subject matter described herein.

Embodiments of the subject matter described herein relate to methods and apparatus for tapping a bidirectional optical fiber that carries data in the full bidirectional mode to provide two unidirectional outputs to two monitoring ports. In an embodiment, a device comprising two sub-devices is provided. Each of the sub-devices functions as a splitter and has three ports, with one port of sub-device 1 being coupled to exchange data in a bidirectional mode with another port of sub-device 2.

In this manner, two three-port splitters together function to provide the tapping function for a bidirectional optical fiber, enabling high speed bidirectional data to be passed back and forth between two bidirectional transceivers via the bidirectional optical fiber while also providing two unidirectional data streams to two monitoring ports.

In another embodiment of the subject matter described herein, single stage 4 port filter may be used to tap a bidirectional optical fiber.

The features and advantages of embodiments of the subject matter described herein may be better understood with reference to the figures and discussion that follow.

FIG. 1 shows an example of a prior art arrangement wherein unidirectional fiber 102 is employed to transmit data between transceiver 104 and transceiver 106. In the case of FIG. 1, data only flows in one direction from transmitting transceiver 104 to receiving transceiver 106.

Figure 2:
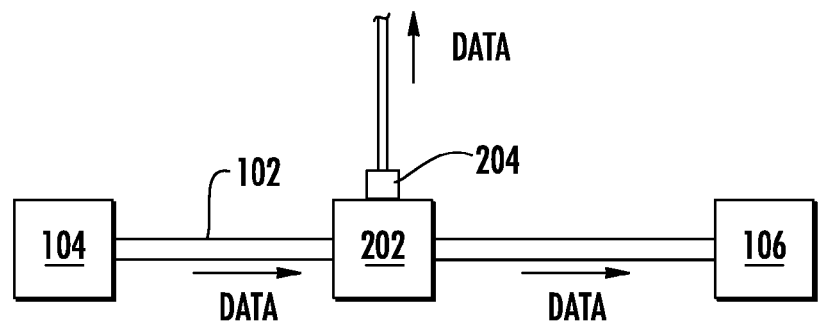
FIG. 2 shows an example of a prior art arrangement wherein a tap is employed to tap unidirectional fiber to provide a data stream out for monitoring purposes.

FIG. 2 shows an example of a prior art arrangement wherein a tap 202 is employed to tap unidirectional fiber 102 to provide a data stream out of port 204 of tap 202. The data stream out of port 204 is a copy of the data traversing unidirectional fiber 102 and may be provided to monitoring equipment to permit monitoring of the data. As in the case of FIG. 1, data is also from transmitting transceiver 104 to receiving transceiver 106.

Figure 3:
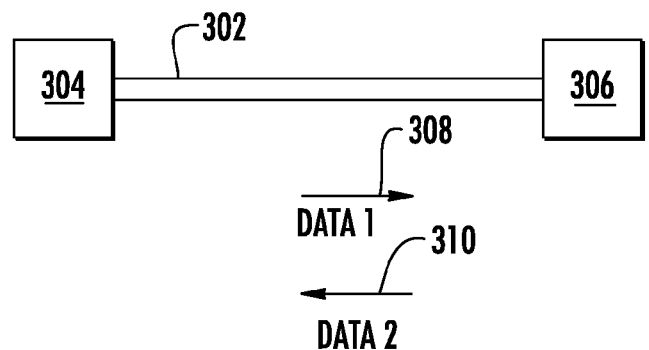
FIG. 3 shows an example of a prior art arrangement wherein a bidirectional fiber is employed to transmit and receive data between two transceivers.

FIG. 3 shows an example of a prior art arrangement wherein bidirectional fiber 302 is employed to transmit and receive data between transceivers 304 and 306. In the case of FIG. 3, data flows both in directions 308 from transceiver 304 to transceiver 306 and in direction 310 from transceiver 306 to transceiver 304. By utilizing the optical fiber in the bidirectional (full duplex) mode instead of the unidirectional mode, the bandwidth capacity of optical fiber 302 is essentially doubled.

Figure 4:
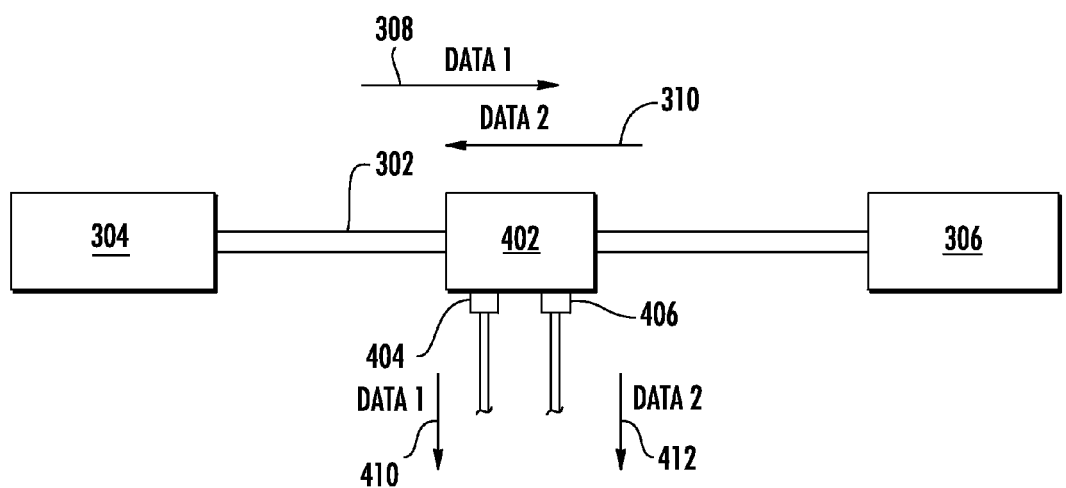
FIG. 4 shows conceptually, in accordance with an embodiment of the subject matter described herein, a tapping arrangement for tapping the bidirectional data on a bidirectional fiber.

FIG. 4 shows conceptually, in accordance with an embodiment of the subject matter described herein, a tapping arrangement for tapping the bidirectional data on bidirectional fiber 302. A tap 402 is employed to tap bidirectional fiber 302 to provide a first data stream 410 out of port 404 of tap 402 and a second data stream 412 out of port 406 of tap 402. The first data stream 410 may be a copy of the data flowing from transceiver 304 to transceiver 306 while the second data stream 412 may be a copy of the data flowing from transceiver 306 to transceiver 304. The first data stream 410 and the second data stream 412 may be provided to respective monitoring devices to enabling monitoring the bidirectional data traversing bidirectional fiber 302.

Figure 5A:
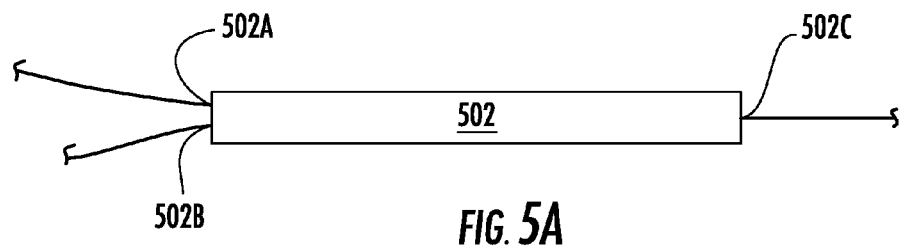
FIG. 5A shows, in accordance with an embodiment, a sub-device for implementing half of the device employed for monitoring bidirectional data on a bidirectional optical fiber according to an embodiment of the subject matter described herein.

FIG. 5A shows, in accordance with one embodiment of the subject matter described herein where tap 402 is implemented using a two stage filter. In FIG. 5A, a sub-device 502 for implementing one of two stages of the device employed for monitoring bidirectional data on a bidirectional optical fiber. In this embodiment, two of sub-devices 502 would be employed to enable monitoring of the bidirectional traffic as will be discussed later herein. In an embodiment, sub-device 502 represents a splitter having three ports 502A, 502B, and 502C. Data input into bidirectional port 502A will be reflected onto ports 502B and 502C. On the other hand, data input into port 502C is sent only to bidirectional port 502A. Thus, two sub-devices 502 may be connected together to implement a bidirectional tap 402.

FIG. 5B illustrates an alternate embodiment of the subject matter described herein where a single stage four port filter may be used to implement bidirectional tap 402. In FIG. 5B, single stage filter 510 includes network ports 510A and 510B and tap ports 510C and 510D. In the illustrated example, network port 510A carries data of wavelength $\lambda_1$, which in the illustrated example is 850 nm, in a first direction and data of wavelength $\lambda_2$, which in the illustrated example is 900 nm, in a second direction opposite the first direction. Network port 510B carries data of wavelength $\lambda_2$ in the second direction and data of wavelength $\lambda_1$ in the first direction. Tap port 510C carries data of wavelength $\lambda_1$ reflected from network port 510A. Tap port 510D carries data of wavelength $\lambda_2$ reflected from port 510B. In one embodiment, tap ports 510C and 510D may be unidirectional ports that carry monitored traffic to a monitoring device.

Figure 6:
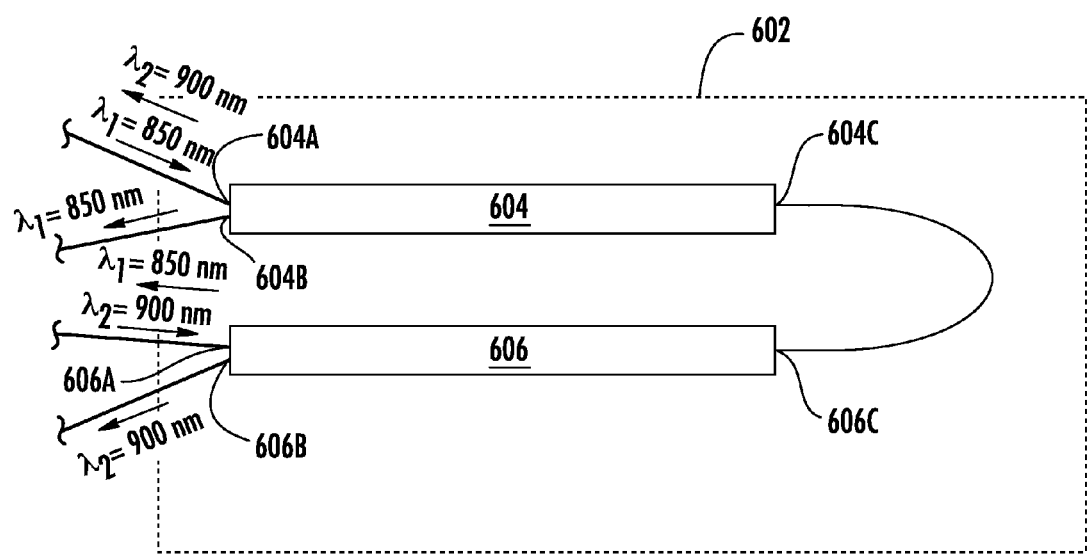
FIG. 6 shows, in accordance with an embodiment of the subject matter described herein, a device comprising two sub-devices for monitoring bidirectional data on a bidirectional optical fiber. A sub-device consists of 2 bidirectional optical splitters that join together to form a simplex fiber channel to tap out both directional wavelengths.

FIG. 6 shows, in accordance with an embodiment of the subject matter described herein, a device 602 comprising two sub-devices or filter stages 604 and 606. Sub-device 604 has three ports: 604A, 604B and 604C. Sub-device 606 has three ports as well: 606A, 606B, and 606C. Bidirectional ports 604C and 606C are coupled to each other to join the splitters or sub-devices together and exchange bidirectional data between the splitters or sub-devices. One of ports 604A and 604B is employed as a bidirectional port to transmit/receive data between the transceivers while the other of ports 604A and 604B is a unidirectional port outputting data to the monitoring equipment. Likewise, one of ports 606A and 606B is employed as a bidirectional port to transmit/receive data between the transceivers while the other of ports 606A and 606B is a unidirectional port outputting data to the monitoring equipment.

Figure 7A:
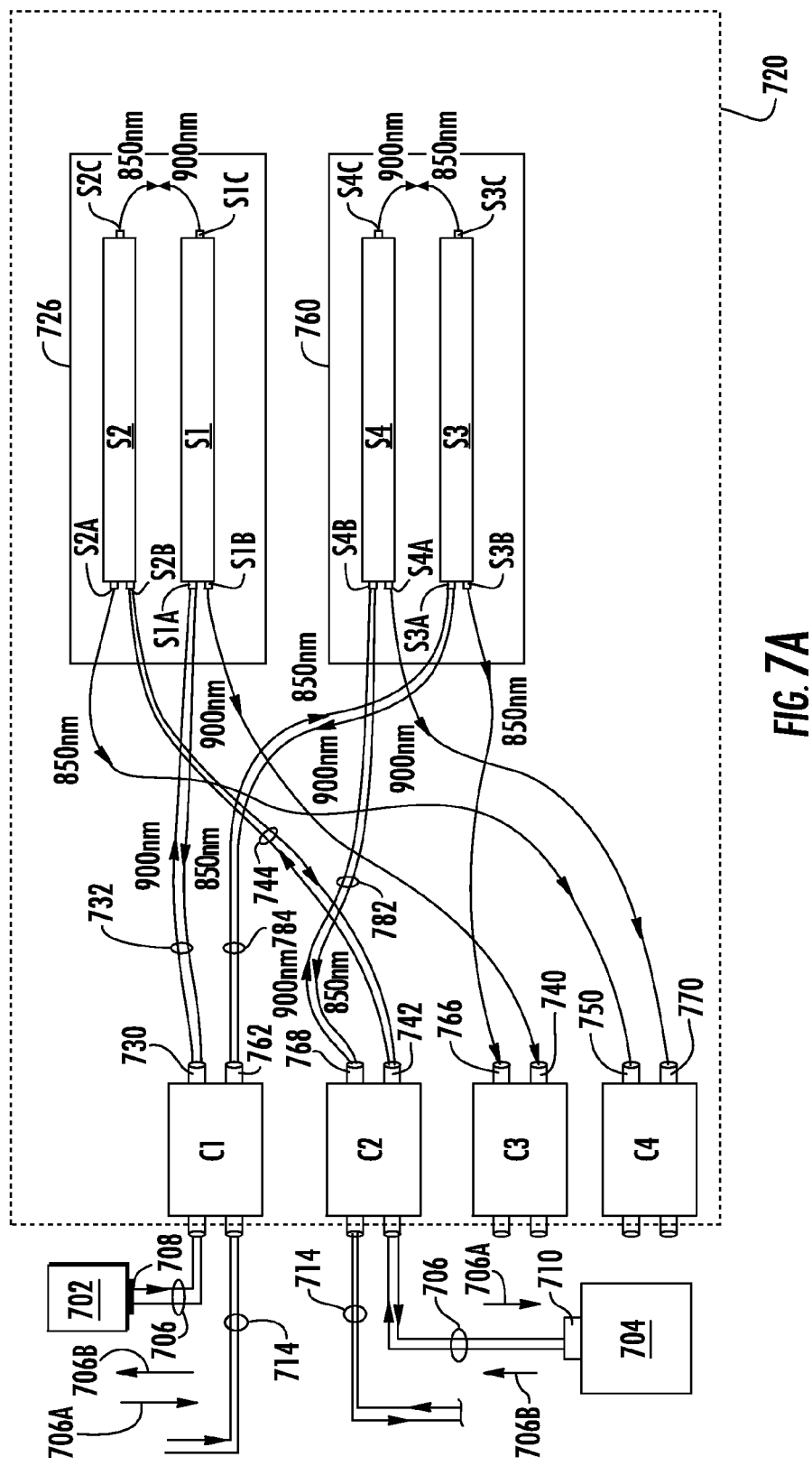
FIG. 7A shows, in accordance with an embodiment of the subject matter described herein, an arrangement for monitoring bidirectional traffic traversing between two transceivers using two sub-devices of bidirectional optical splitters. This joined configuration in FIG. 7A will provide an LC duplex bidirectional tap solution.

FIG. 7A shows, in accordance with an embodiment of the subject matter described herein, an arrangement for monitoring bidirectional traffic traversing between two transceivers 702 and 704 on bidirectional fiber 706. The bidirectional data comprises a first data flow 706A in the direction from transceiver 702 to transceiver 704 and a second data flow 706B in the direction from transceiver 704 to transceiver 702.

As shown in FIG. 7A, bidirectional fiber 706 is coupled with a bidirectional port 708 of transceiver 702 and a bidirectional port 710 of transceiver 704. A tap 720 is provided to tap bidirectional fiber 706. Tap 720 includes connectors C1, C2, C3 and C4 for coupling with optical fibers. Four connectors are shown to facilitate monitoring of the two bidirectional optical fibers 706 and 714 in the manner discussed below.

For the purpose of explanation, the discussion below focuses on the tapping of data traversing bidirectional optical fiber 706. The tapping operation for data traversing bidirectional optical fiber 714 operates similarly. Like fiber 706, data flows in both directions in fiber 714 at different wavelengths. Thus, connector C1 may receive data in one direction at one wavelength over fiber 714 and transmit data in the opposite direction at a different wavelength over fiber 714. Similarly, connector C2 may receive data in one direction at one wavelength over fiber 714 and transmit data in the opposite direction at a different wavelength over fiber 714.

As can be seen in FIG. 7A, tap 720 includes a device 726 that comprises two sub-devices S1 and S2. Device 726 may be the same as device 602 illustrated in FIG. 6. Sub-device S1 has three ports S1A, S1B, and S1C as shown. Sub-device S2 also has three ports S2A, S2B, and S2C, with ports S2C of sub-device S2 coupled to port S1C of sub-device S1 using an appropriate connector (such as a piece of optical fiber) to exchange bidirectional data. In an embodiment and not by way of limitation, device 726 is implemented by a dual splitter that comprises two splitters S1 and S2.

A first data flow 706A from port 708 of transceiver 702 is inputted into port S1A of sub-device S1 (via a coupler 730 on connector C1 and an appropriate bidirectional optical fiber 732 between coupler 730 and port S1A). This first data flow 706A is copied onto port S1B and port S1C of sub-device S1. Port S1B provides this first data flow 706A in a half-duplex manner to coupler 740 of connector C3. A monitoring device may receive this first data flow 706A from coupler 740 for monitoring purpose. The first data flow 706A that is provided to port S1C of sub-device S1 is received by port S2C of sub-device S2. This first data flow 706A is then provided to port S2B of sub-device S2, and is subsequently provided to coupler 742 of connector C2. From coupler 742 of connector C2, this first data flow 706A continues on to port 710 of transceiver 706. A second data flow 706B in the reverse direction from flow 706A originates from port 710 of transceiver 704 and is inputted into port S2B of sub-device S2 (via a coupler 742 on connector C2 and an appropriate bidirectional optical fiber 744 between coupler 742 and port S2B). This second data flow 706B is copied onto port S2A and port S2C of sub-device S2. Port S2A provides this second data flow 706B in a half-duplex manner to coupler 750 of connector C4. A monitoring device may receive this second data flow 706B from coupler 750 for monitoring purpose. The second data flow 706B that is provided to port S2C of sub-device S2 is received by port S1C of sub-device S1. This second data flow 706B is then provided to port S1A of sub-device S1, and is subsequently provided to coupler 730 of connector C1 via fiber 732. From coupler 730 of connector C1, this second data flow 706B continues on to port 708 of transceiver 702. Since the first data flow 706A and the second data flow 706B employ different wavelengths, they can co-exist on for example port S1A, on port S2B, on fiber 706, on fiber 732, on fiber 744, on coupler 730 of connector C1, and on coupler 742 of connector C2.

Thus, bidirectional data (comprising data flow 706A and data flow 706B) on bidirectional fiber 706 is tapped and copies of data flow 706A and 706B are provided to respective coupler 740 of connector C3 and coupler 750 of connector C4.

A similar arrangement exists with respect to the bidirectional data flowing on bidirectional fiber 714 and tapped by the device 760 comprising sub-devices S3 and S4. Like device 726, device 760 may be the same as device 602 illustrated in FIG. 6.

For example, the data inputted into coupler 762 of connector C1 is received by port S3A of sub-device S3 (via fiber 784) and copied onto ports S3B and S3C. Port S3B provides the copy of this data in a half-duplex manner to monitoring equipment (via coupler 766 of connector C3). Port S3C of sub-device S3 is coupled to port S4C of sub-device S4 to exchange bidirectional data. Thus the data is received by port S4C from port S3C. From port S4C, this data flows out of port S4B to proceed onward on bidirectional fiber 714 (via coupler 768 of connector C2 and optical fiber 782) after being tapped.

In the reverse direction from the data from optical fiber 714 inputted into coupler 762, the data inputted into coupler 768 of connector C2 is received by port S4B and copied onto port S4A and S4C. Port S4A provides the copy of this data in a half-duplex manner to monitoring equipment (via coupler 770 of connector C4). Port S4C of sub-device S4 is coupled to port S3C of sub-device S3 to exchange bidirectional data. Thus the data is received by port S3C from port S4C. From port S3C, this data flows out of port S3A to proceed onward on bidirectional fiber 714 (via coupler 762 of connector C1 and fiber 784) after being tapped.

FIG. 7A represents an example showing a pair of bidirectional optical fibers (706 and 714) coupled to couplers 730 and 762 of connector C1 on one side of tap 720. Data on this pair of optical fibers (706 and 714) is provided on the other side of tap 720 via respective couplers 742 and 768 of connector C2. Monitoring is enabled by unidirectional output data from couplers 766, 740, 750, and 770 of connectors C3 and C4 as discussed above.

It should be understood, however, that although coupler 742 is disposed on connector C2, it is possible to pair up coupler 742 with coupler 730 on connector C1 if desired. In this case, one side of bidirectional fiber 706 would be coupled to coupler 730 of connector C1 while the other side of bidirectional fiber 706 would be coupled to coupler 742 which would be now moved to connector C1.

Likewise on the monitoring side, although coupler 750 is disposed on connector C4, it is possible to pair coupler 750 with coupler 740 on connector C3. In this case, the two couplers on connector C3 provide the two unidirectional data flows for monitoring purposes for the bidirectional data flows on bidirectional fiber 706.

Furthermore, although each connector is shown in FIG. 7A to have only two couplers, it is possible to employ connectors having only a single coupler each, or 3 couplers each, or 4 couplers each, or any arbitrary number of couplers in each connector. These are only examples of the mixing-and-matching that may be made between the couplers and the connectors.

Figure 7B:
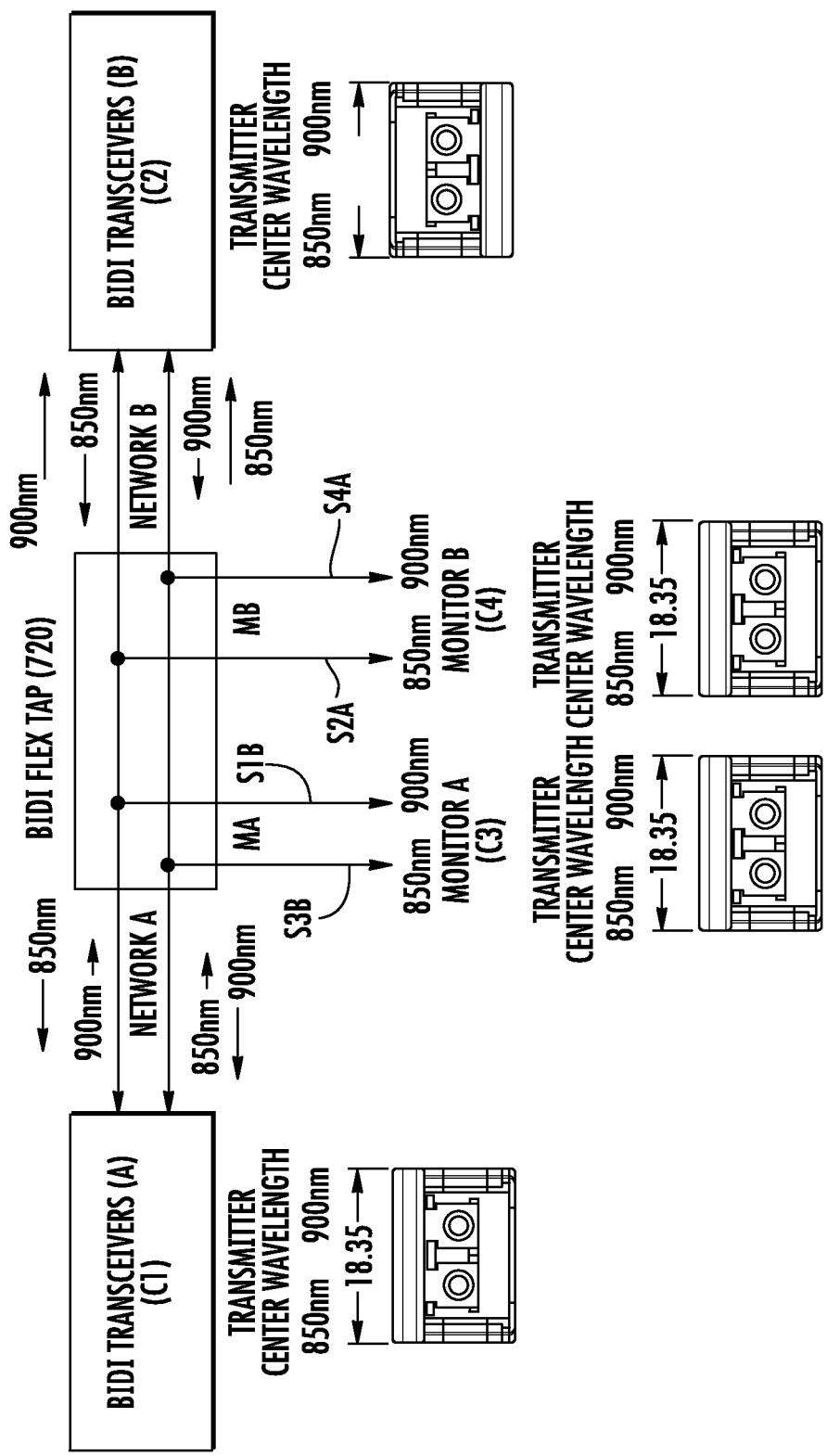
FIG. 7B is a simplified version of the bi-directional tap illustrated in FIG. 7A.

FIG. 7B is a simplified version of the bi-directional tap illustrated in FIG. 7A. In FIG. 7B, the center wavelength for which each fiber is designed is shown for illustrative purposes. It is understood that different fibers structured to carry different center wavelengths may be used without departing from the scope of the subject matter described herein. It is also understood that the fibers corresponding to the network ports on each tap may be structured to carry one center wavelength in one direction and a different center wavelength in the opposite direction. FIG. 7B also shows cross sectional views of connectors C1-C4. Connectors C1-C4 are illustrated outside of bi-directional tap 720 in FIG. 7B. However, it is understood that bi-directional tap 720 and connectors C1-C4 would be integrated into a single package.

In one embodiment, each of sub-devices S1, S2, S3, and S4 may be implemented by an off the shelf splitter manufactured by GLSUN, Guanglong S&T Zone, No. 8 High-Tech Industry Park Chaoyang Road, Guilin, China (specification no. S1197). The splitter corresponding to sub-devices S1, S2, S3, and S4 is also illustrated in FIG. 5A as sub-device 502.

Figure 8:
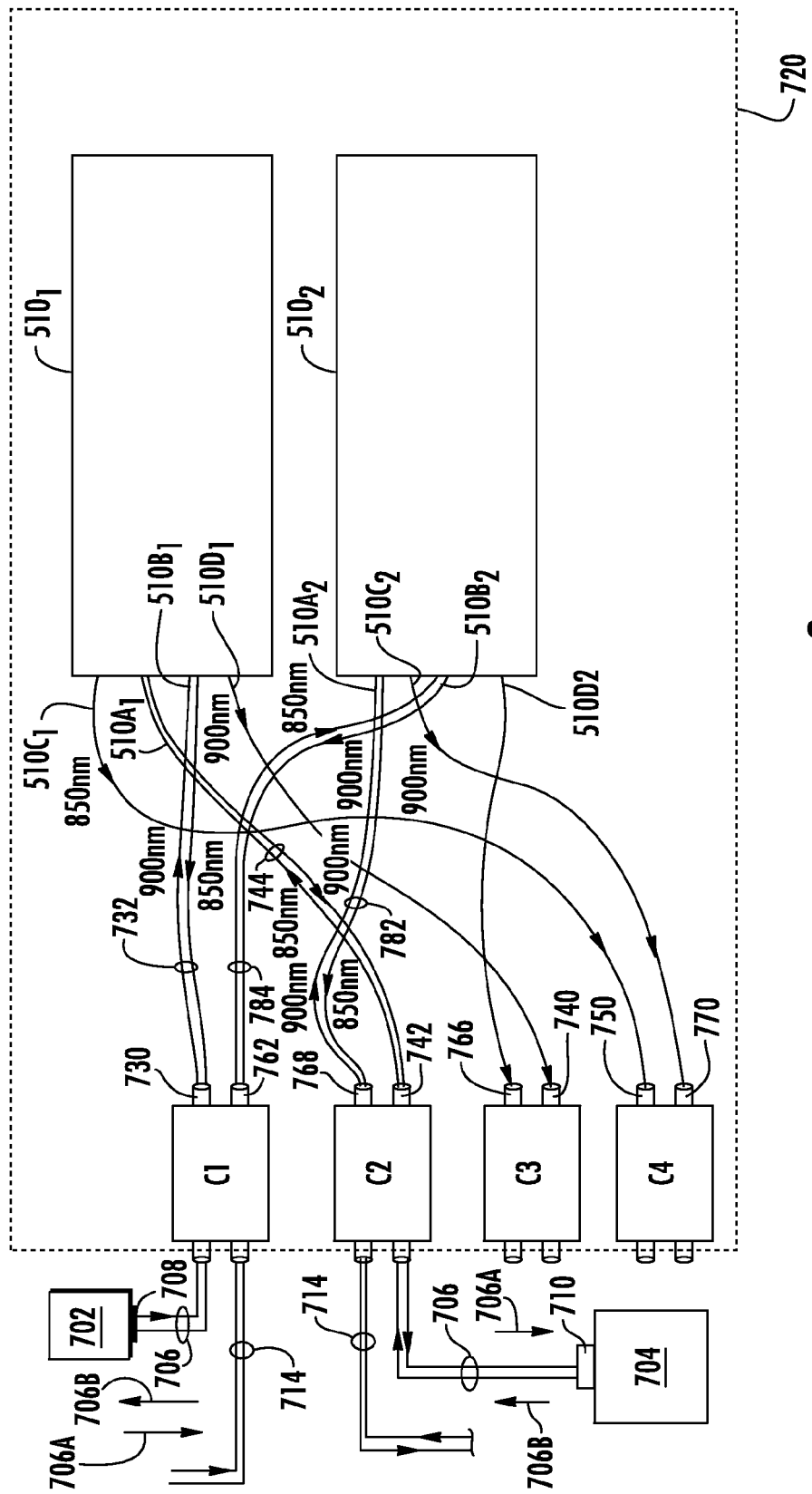
FIG. 8 shows, in accordance with an alternate embodiment of the subject matter described herein, an arrangement for monitoring bidirectional traffic traversing between two transceivers using two bidirectional optical splitters. This joined configuration on FIG. 8 will provide an LC duplex bidirectional tap solution.

In an alternate embodiment, the four sub-devices to implement the bidirectional filter illustrated in FIG. 7A can be replaced by two dual splitters as illustrated in FIG. 8. FIG. 8 is similar to FIG. 7A except that devices 726 and 760 respectively comprised of subdevices S1 and S2 and S3 and S4 are replaced by single stage four port network tap devices $510_1$ and $510_2$, each of which may be the same as device 510 illustrated in FIG. 5B. Devices $510_1$ and $510_2$ can be considered dual splitters since they split the transmitted wavelengths in both directions. In FIG. 8, tap 720 includes a device $510_1$ that comprises a single stage four port device with bidirectional network ports $510A_1$ and $510B_1$ and tap ports $510C_1$ and $510D_1$. Tap 720 further includes a device $510_2$ that comprises a single stage four port device with bidirectional network ports $510A_2$ and $510B_2$ and tap ports $510C_2$ and $510D_2$.

A first data flow 706A in the reverse direction from flow 706A originates from port 708 of transceiver 702 and is inputted into port $510B_1$ of device $510_1$ (via a coupler 730 on connector C1 and an appropriate bidirectional optical fiber 732 between coupler 730 and port $510B_1$). This first data flow 706A is copied onto tap port $510D_1$ and network port $510A_1$ of device $510_1$. Tap port $510D_1$ provides this first data flow 706A in a half-duplex manner to coupler 740 of connector C3. A monitoring device may receive this first data flow 706A from coupler 740 for monitoring purpose. The first data flow 706A that is provided to network port $510A_1$ of device $510_1$ is provided to coupler 742 of connector C2. From coupler 742 of connector C2, this first data flow 706A continues on to port 710 of transceiver 706.

A second data flow 706B from port 710 of transceiver 704 is inputted into network port $510A_1$ of device $510_1$ (via a coupler 742 on connector C2 and an appropriate bidirectional optical fiber 744 between coupler 742 and network port $510A_1$). This second data flow 706B is copied onto tap port $510C_1$ and network port $510B_1$ of device $510_1$. Tap port $510C_1$ provides this second data flow 706B in a half-duplex manner to coupler 750 of connector C4. A monitoring device may receive this second data flow 706B from coupler 750 for monitoring purposes. The second data flow 706B that is provided to network port $510B_1$ of device $510_1$, and is subsequently provided to coupler 730 of connector C1 via fiber 732. From coupler 730 of connector C1, this second data flow 706B continues on to port 708 of transceiver 702. Since the first data flow 706A and the second data flow 706B employ different wavelengths, they can co-exist on for example network port $510B_1$, on network port $510A_1$, on fiber 706, on fiber 732, on fiber 744, on coupler 730 of connector C1, and on coupler 742 of connector C2.

Thus bidirectional data (comprising data flow 706A and data flow 706B) on bidirectional fiber 706 is tapped and copies of data flow 706A and 706B are provided to respective coupler 740 of connector C3 and coupler 750 of connector C4.

A similar arrangement exists with respect to the bidirectional data flowing on bidirectional fiber 714 and tapped by the device $510_2$.

For example, data flowing in a first direction on optical fiber 714 and having a first wavelength may be inputted into coupler 762 of connector C1, received by network port $510B_2$ of device $510_2$ (via fiber 784), and copied onto tap port $510D_2$ and network port $510A_2$. Tap port $510D_2$ provides the copy of this data in a half-duplex manner to monitoring equipment (via coupler 766 of connector C3). Network port $510B_2$ of device $510_2$ is coupled to network port $510A_2$ of device $510_2$ to exchange bidirectional data. Thus, inbound data received on network port $510B_2$ flows out of port network port $510A_2$ to proceed onward on bidirectional fiber 714 (via coupler 768 of connector C2 and optical fiber 782) after being tapped.

Data flowing in a second direction opposite the first direction on optical fiber 714 and having a second wavelength different from the first wavelength may be inputted into coupler 768 of connector C2, received by network port $510A_2$, and copied by network port $510A_2$ onto tap port $510C_2$ and network port $510B_2$. Tap port $510C_2$ provides the copy of this data in a half-duplex manner to monitoring equipment (via coupler 770 of connector C4). Network port $510A_2$ of device $510_2$ is coupled to network port $510B_2$ of device $510_2$ to exchange bidirectional data. Thus, the data received by port $510A_2$ flows out of port $510B_2$ to proceed onward on bidirectional fiber 714 (via coupler 762 of connector C1 and fiber 784) after being tapped.

FIG. 8 represents an example showing a pair of bidirectional optical fibers (706 and 714) coupled to couplers 730 and 762 of connector C1 on one side of tap 720. Data on this pair of optical fibers (706 and 714) is provided on the other side of tap 720 via respective couplers 742 and 768 of connector C2. Monitoring is enabled by unidirectional output data from couplers 766, 740, 750, and 770 of connectors C3 and C4 as discussed above.

It should be understood, however, that although coupler 742 is disposed on connector C2, it is possible to pair up coupler 742 with coupler 730 on connector C1 if desired. In this case, one side of bidirectional fiber 706 would be coupled to coupler 730 of connector C1 while the other side of bidirectional fiber 706 would be coupled to coupler 742 which would be now moved to connector C1.

Likewise on the monitoring side, although coupler 750 is disposed on connector C4, it is possible to pair coupler 750 with coupler 740 on connector C3. In this case, the two couplers on connector C3 provide the two unidirectional data flows for monitoring purposes for the bidirectional data flows on bidirectional fiber 706.

Furthermore, although each connector is shown in FIG. 8 to have only two couplers, it is possible to employ connectors having only a single coupler each, or 3 couplers each, or 4 couplers each, or any arbitrary number of couplers in each connector. These are only examples of the mixing-and-matching that may be made between the couplers and the connectors.

An important advantage of the subject matter described herein is the small form factor that results. This is due to, in one embodiment, the use of highly compact splitters that can handle high speed data to form a dual splitter for the purpose of tapping. The small form factor of the bidirectional tap enables a higher tap density (e.g., more taps per server rack or per chassis). This small form factor is extremely important in today's cramped server racks and over-populated data centers.

As can be appreciated from the foregoing, embodiments of the invention enable monitoring of high-speed (e.g., 10 gigabits/second and above) data that traverses bidirectionally on a bidirectional optical fiber. Embodiments of the invention result in a highly compact tap form factor, which is highly advantageous in today's market. As a result, more taps can be provided in a given chassis or server rack, enabling greater monitoring capacity than possible previously.

Figure 9:
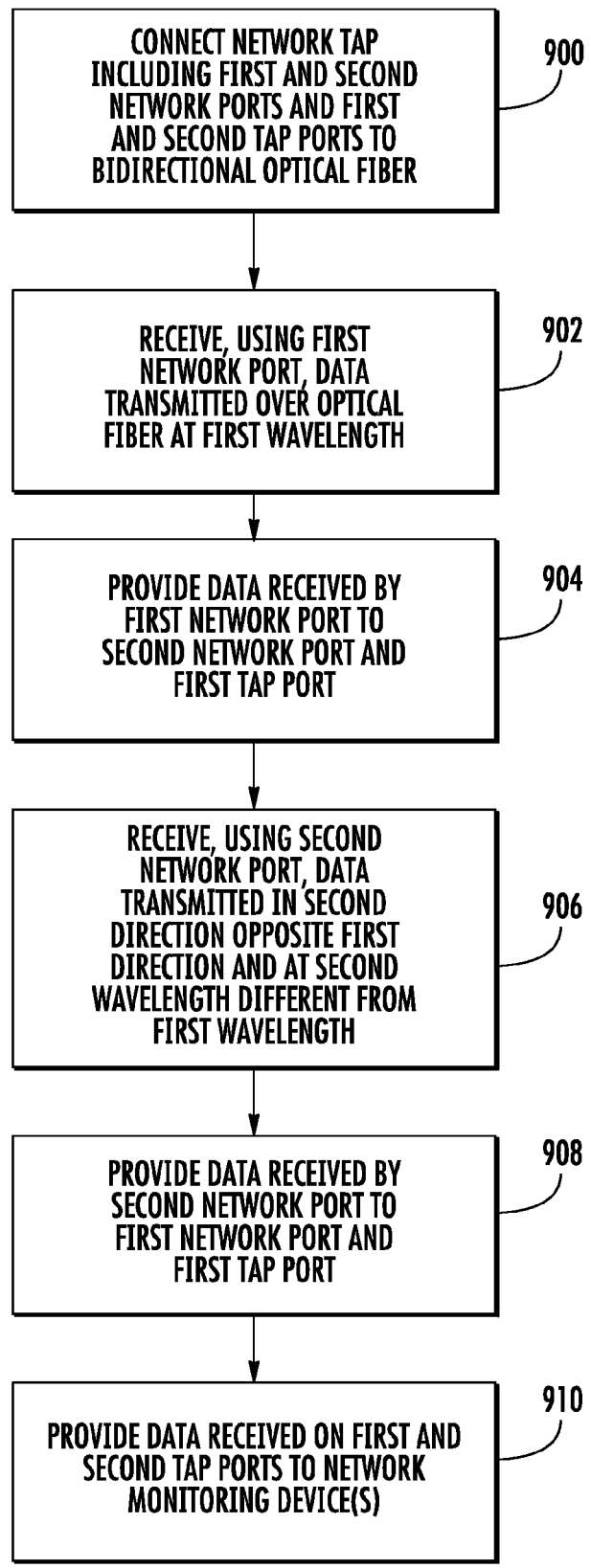
FIG. 9 is a flow chart illustrating an exemplary process for monitoring data on a bidirectional optical fiber according to an embodiment of the subject matter described herein.

FIG. 9 is a flow chart illustrating an exemplary process for monitoring data on a bidirectional optical fiber according to an embodiment of the subject matter described herein. Referring to FIG. 9, in step 900, the method includes connecting a network tap including first and second network ports and first and second tap ports to a bidirectional optical fiber. For example a network tap 720 may be connected to a bidirectional optical fiber 706 or 714, as illustrated in FIG. 7 or FIG. 8.

In step 902, the method includes receiving, using the first network port, data transmitted in a first direction over the first optical fiber and at a first wavelength. For example, data may be received on network port S1A of sub-device S1 illustrated in FIG. 7 or on network port $510B_1$ of device $510_1$ illustrated in FIG. 8.

In step 904, the method includes providing the data received by the first network port to the second network port and to the first tap port. For example, data received on network port S1A illustrated in FIG. 7 may be provided to tap port S1B and to network port S2B or data received on network port $510B_1$ illustrated in FIG. 8 may be provided to tap port $510D_1$ and to network port $510A_1$.

In step 906, the method further includes receiving, using the second network port, data transmitted in a second direction opposite the first direction over the first optical fiber and at a second wavelength different from the first wavelength. For example, data may be received by network port S2B of sub-device S2 illustrated in FIG. 7 or at network port $510A_1$ of device $510_1$ illustrated in FIG. 8.

In step 908, the method includes providing the data received by the second network port to the first network port and to the second tap port. For example, the data received on network port S2B in FIG. 7 may be provided to tap port S2A and network port S1A. In FIG. 8, the data received on network port $510A_1$ may be provided to network port $510B_1$ and to tap port $510C_1$.

In step 910, the method includes providing the data form the first and second tap ports to one or more network monitoring devices. In FIG. 7, the data from tap ports S1B and S2B may be provided to network monitoring devices via connectors C3 and C4, respectively. In FIG. 8, data provided from tap ports $510D_1$ and $510C_1$ may be provided to network monitoring devices via connectors C3 and C4 respectively. Examples of network monitoring devices include intrusion detection systems, intrusion protection systems, performance monitoring systems, etc.

While the subject matter described herein has been described in terms of several preferred embodiments, there are alterations, permutations, and equivalents, which fall within the scope of this invention. The invention should be understood to also encompass these alterations, permutations, and equivalents. It should also be noted that there are many alternative ways of implementing the methods and apparatuses of the present invention. Although various examples are provided herein, it is intended that these examples be illustrative and not limiting with respect to the invention.

What is claimed is:

1. A system for monitoring data traversing a bidirectional optical fiber, the system comprising:
    a network tap including:
        first and second network ports for bidirectional data transmission over a first optical fiber;
        first and second tap ports respectively associated with the first and second network ports;
        wherein the first network port receives data transmitted in a first direction over the first optical fiber and at a first wavelength and provides the data to the second network port and to the first tap port;
        wherein the second network port receives data transmitted in a second direction opposite the first direction over the first optical fiber and at a second wavelength different from the first wavelength and provides the data to the first network port and to the second tap port;
        wherein the first and second tap ports provide the data to one or more network monitoring devices;
        wherein the network tap comprises a first device having first and second sub-devices connected to each other, wherein the first network port and the first tap port are components of the first sub-device and wherein the second network port and the second tap port are components of the second sub-device; and
        wherein the first and second sub-devices each comprise splitters having a third network port for connecting the splitters together.

2. The system of claim 1 wherein the first network port is configured to reflect the data transmitted in the first direction at the first wavelength to the first tap port.

3. The system of claim 1 wherein the second network port is configured to reflect the data transmitted in the second direction at the second wavelength to the second tap port.

4. A system for monitoring data traversing a bidirectional optical fiber, the system comprising:
    a network tap including:
        first and second network ports for bidirectional data transmission over a first optical fiber;
        first and second tap ports respectively associated with the first and second network ports;
        wherein the first network port receives data transmitted in a first direction over the first optical fiber and at a first wavelength and provides the data to the second network port and to the first tap port;
        wherein the second network port receives data transmitted in a second direction opposite the first direction over the first optical fiber and at a second wavelength different from the first wavelength and provides the data to the first network port and to the second tap port;
        wherein the first and second tap ports provide the data to one or more network monitoring devices;
    a first device, wherein the first and second network ports and the first and second tap ports are components of the first device;
    a second device comprising:
        first and second network ports for bidirectional data transmission over a second optical fiber;
        first and second tap ports respectively associated with the first and second network ports;
        wherein the first network port receives data transmitted in a first direction over the second optical fiber and at a third wavelength and provides the data to the second network port and to the first tap port;
        wherein the second network port receives data transmitted in a second direction opposite the first direction over the second optical fiber and at a fourth wavelength different from the third wavelength and provides the data to the first network port and to the second tap port;
        wherein the first and second tap ports provide the data to one or more network monitoring devices;
        wherein the network tap includes first, second, third, and fourth connectors for connecting the first and second devices to the first and second optical fibers and to the one or more network monitoring devices; and
        wherein the first connector is connected to the first network port of the first device and the second network port of the second device, wherein the second connector is connected to the second network port of the second device and the first network port of the second device, wherein the third connector is connected to the second tap port of the first device and the first tap port of the second device, and wherein the fourth connector is connected to the first tap port of the first device and the second tap port of the second network port.

5. The system of claim 1 wherein the first sub-device is configured to copy the data received on the first network port to the third network port of the first sub-device and to the first tap port, wherein the data reaches the second network port via the third network ports of the first and second sub-devices.

6. The system of claim 1 comprising a dual splitter, wherein the first and second network ports and the first and second tap ports are components of the dual splitter.

7. A method for monitoring data traversing a bidirectional optical fiber, the method comprising:
  connecting a network tap including first and second network ports and first and second tap ports to a bidirectional optical fiber;
  receiving, using the first network port, data transmitted in a first direction over the first optical fiber and at a first wavelength;
  providing the data received by the first network port to the second network port and to the first tap port;
  receiving, using the second network port, data transmitted in a second direction opposite the first direction over the first optical fiber and at a second wavelength different from the first wavelength;
  providing the data received by the second network port to the first network port and to the second tap port;
  providing the data form the first and second tap ports to one or more network monitoring devices;
  wherein the network tap comprises a first device having first and second sub-devices connected to each other, wherein the first network port and the first tap port are components of the first sub-device and wherein the second network port and the second tap port are components of the second sub-device; and
  wherein the first and second sub-devices each comprise splitters having a third network port for connecting the splitters together.

8. The method of claim 7 wherein providing the data received by the first network port to the first tap port comprises reflecting the data transmitted in the first direction at the first wavelength to the first tap port.

9. The method of claim 7 wherein providing the data transmitted in the second direction at the second wavelength to the second tap port comprises reflecting the data transmitted in the second direction at the second wavelength to the second tap port.

10. A method for monitoring data traversing a bidirectional optical fiber, the method comprising:
  connecting a network tap including first and second network ports and first and second tap ports to a bidirectional optical fiber;
  receiving, using the first network port, data transmitted in a first direction over the first optical fiber and at a first wavelength;
  providing the data received by the first network port to the second network port and to the first tap port;
  receiving, using the second network port, data transmitted in a second direction opposite the first direction over the first optical fiber and at a second wavelength different from the first wavelength;
  providing the data received by the second network port to the first network port and to the second tap port; and
  providing the data form the first and second tap ports to one or more network monitoring devices;
  wherein the first and second network ports and the first and second tap ports are components of a first device;
  wherein the network tap comprises:
    a second device comprising:
      first and second network ports for bidirectional data transmission over a second optical fiber;
      first and second tap ports respectively associated with the first and second network ports;
      wherein the first network port receives data transmitted in a first direction over the second optical fiber and at a third wavelength and provides the data to the second network port and to the first tap port;
      wherein the second network port receives data transmitted in a second direction opposite the first direction over the second optical fiber and at a fourth wavelength different from the third wavelength and provides the data to the first network port and to the second tap port;
      wherein the first and second tap ports provide the data to one or more network monitoring devices;
      wherein the network tap includes first, second, third, and fourth connectors for connecting the first and second devices to the first and second optical fibers and to the one or more network monitoring devices; and
      wherein the first connector is connected to the first network port of the first device and the second network port of the second device, wherein the second connector is connected to the second network port of the second device and the first network port of the second device, wherein the third connector is connected to the second tap port of the first device and the first tap port of the second device, and wherein the fourth connector is connected to the first tap port of the first device and the second tap port of the second network port.

11. The method of claim 7 comprising copying the data received on the first network port to the third network port of the first sub-device and to the first tap port, wherein the data reaches the second network port via the third network ports of the first and second sub-devices.

12. The method of claim 7 wherein the first and second network ports and the first and second tap ports are components of a dual splitter.

* * * * *